No. 804,914. PATENTED NOV. 21, 1905.
G. ALLEN.
CAR FENDER.
APPLICATION FILED JULY 8, 1905.

WITNESSES
E. J. Nottingham
G. F. Downing

INVENTOR
G. Allen
By H. A. Seymour
Attorney

UNITED STATES PATENT OFFICE.

GEORGE ALLEN, OF FRANKLIN, PENNSYLVANIA.

CAR-FENDER.

No. 804,914.   Specification of Letters Patent.   Patented Nov. 21, 1905.

Application filed July 8, 1905. Serial No. 268,781.

*To all whom it may concern:*

Be it known that I, GEORGE ALLEN, a resident of Franklin, in the county of Venango and State of Pennsylvania, have invented certain new and useful Improvements in Car-Fenders; and I do hereby declare the following to be a full, clear, and exact description of the invention, such as will enable others skilled in the art to which it appertains to make and use the same.

My invention relates to improvements in car-fenders, the object of the invention being to provide a vertically-disposed fender having a vertical central pivotal support and provide means which enable the operator to throw the fender and hold it inclined in either direction, and hence project an object on the track to either side thereof, as the operator may judge most desirable; and with this object in view the invention consists in certain novel features of construction and combinations and arrangements of parts, as will be more fully hereinafter described, and pointed out in the claims.

Figure 1:
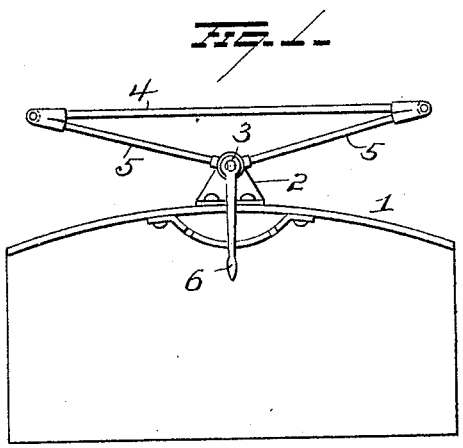
Figure 2:
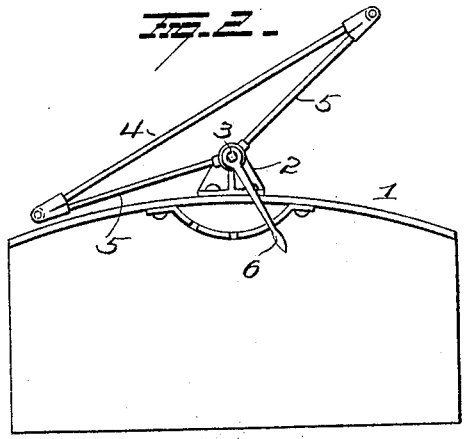
Figure 3:
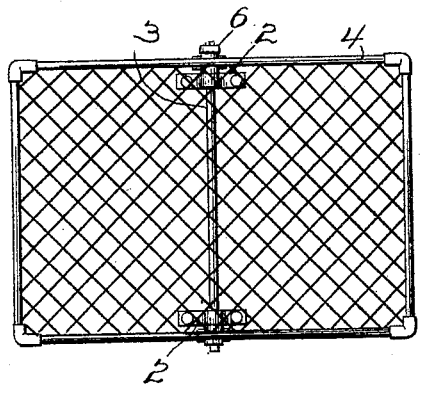

In the accompanying drawings, Figures 1 and 2 are top plan views illustrating my improvements. Fig. 3 is a front view, and Fig. 4 is a view of a modification.

1 represents the front platform of a car provided with forwardly-projecting brackets 2, having alined openings forming bearings for a vertical shaft 3.

4 represents my improved fender, which may be of any desired form, yet preferably consisting of a rectangular frame supporting a wire or rope netting and provided at its top and bottom with rods 5, which converge rearwardly and are secured to shaft 3. A lever or arm 6 is secured to the upper end of shaft 3 and by means of which the operator can throw the fender to an inclined position to deflect an object on the track to either side, as he may think advisable. The fender may normally remain in a position at right angles to the track, and should a person step onto the track and cannot get out of the way of the approaching car the motorman will grasp lever 6 and throw the fender to an inclined position, so that when the fender strikes the person he will be deflected to the side of the track the motorman may think best.

Figure 4:
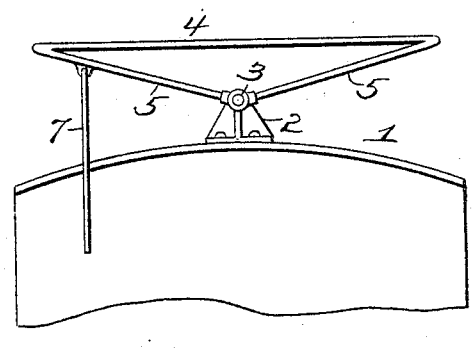

In the modification shown in Fig. 4 a rod or lever 7 is connected to the fender near one end to throw the same to either inclined position, and various other means may be provided for positively actuating the fender. Hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination of a vertical fender having a centrally-located vertical pivot, and means for positively turning said fender on its pivot.

2. The combination of a vertical fender having a centrally-located vertical pivot and a lever constructed to turn the fender to an inclined or diagonal position and for locking it in such position.

3. The combination with supports, of a vertical shaft mounted near its ends in said supports, a vertical fender, rearwardly-converging bars connected at their front ends to said fender and at their rear ends to said shaft and means for turning the shaft, substantially as set forth.

In testimony whereof I have signed this specification in the presence of two subscribing witnesses.

GEORGE ALLEN.

Witnesses:
J. C. BUTLER,
WM. B. GRIFFEN.